US009584313B2

(12) United States Patent
Thompson

(10) Patent No.: US 9,584,313 B2
(45) Date of Patent: *Feb. 28, 2017

(54) STREAMING ONE TIME PAD CIPHER USING ROTATING PORTS FOR DATA ENCRYPTION

(71) Applicant: Introspective Power, Inc., Broomfield, CO (US)

(72) Inventor: Anthony Scott Thompson, Broomfield, CO (US)

(73) Assignee: INTROSPECTIVE POWER, INC., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,158

(22) Filed: Dec. 16, 2013

(65) Prior Publication Data

US 2015/0043730 A1 Feb. 12, 2015

Related U.S. Application Data

(60) Provisional application No. 61/864,383, filed on Aug. 9, 2013.

(51) Int. Cl.
*H04L 9/06* (2006.01)
*H04L 9/18* (2006.01)

(52) U.S. Cl.
CPC .............. *H04L 9/0656* (2013.01); *H04L 9/18* (2013.01)

(58) Field of Classification Search
CPC ................................. H04L 9/18; H04L 9/0656
See application file for complete search history.

(56) References Cited

U.S. PATENT DOCUMENTS

| 6,335,927 | B1 | 1/2002 | Elliott et al. |
| 6,445,794 | B1 | 9/2002 | Shefi |
| 6,986,046 | B1 * | 1/2006 | Tuvell et al. ................. 713/171 |
| 7,133,525 | B1 | 11/2006 | DeGregorio et al. |
| 7,505,588 | B2 | 3/2009 | Mironov et al. |
| 7,930,761 | B2 | 4/2011 | Smith et al. |
| 8,266,438 | B2 | 9/2012 | Orsini et al. |
| 8,632,405 | B2 * | 1/2014 | Loose ............................ 463/29 |

(Continued)

FOREIGN PATENT DOCUMENTS

GB 2427333 A * 12/2006 ............... H04L 9/08
WO 2007/060587 A1 5/2007

OTHER PUBLICATIONS

Gunter, Manuel, et al., "Secure Communication: A New Application for Active Networks," IAM-00-007, Jul. 2000, pp. 1-17.

(Continued)

*Primary Examiner* — Michael Pyzocha
(74) *Attorney, Agent, or Firm* — Nixon & Vanderhye P.C.

(57) ABSTRACT

A streaming one time pad cipher using rotating ports for data encryption uses a One Time Pad (OTP) and an Exclusive Or (XOR) (or other cipher) with a public key channel to encrypt and decrypt OTP data. There is no method in cryptography to thwart the OTP/XOR method and it is proven impossible to crack. The method also rotates the ports of the channels periodically to increase communication obfuscation. Through pre-fetching and cache of OTP data, latency increases from encryption are kept to an absolute minimum as the XOR for encryption and decryption is done with a minimal number of instructions.

31 Claims, 7 Drawing Sheets

(56) References Cited

U.S. PATENT DOCUMENTS

| | | | |
|---|---|---|---|
| 2002/0112076 A1 | 8/2002 | Rueda et al. | |
| 2002/0146119 A1 | 10/2002 | Liss | |
| 2003/0016821 A1 | 1/2003 | Hammersmith | |
| 2003/0142821 A1 | 7/2003 | Ross | |
| 2003/0149869 A1* | 8/2003 | Gleichauf | 713/153 |
| 2004/0141461 A1* | 7/2004 | Zimmer et al. | 370/216 |
| 2007/0016794 A1* | 1/2007 | Harrison et al. | 713/182 |
| 2007/0172054 A1* | 7/2007 | Munro et al. | 380/28 |
| 2008/0031456 A1 | 2/2008 | Harrison et al. | |
| 2008/0144836 A1* | 6/2008 | Sanders et al. | 380/278 |
| 2008/0147820 A1* | 6/2008 | Maeda et al. | 709/213 |
| 2008/0313348 A1* | 12/2008 | Morris | H04L 9/0841 709/239 |
| 2009/0217027 A1* | 8/2009 | Ayalon | 713/150 |
| 2009/0224884 A1* | 9/2009 | Tuttle | 340/10.1 |
| 2010/0174897 A1 | 7/2010 | Schumacher | |
| 2010/0299313 A1 | 11/2010 | Orsini et al. | |
| 2010/0332630 A1* | 12/2010 | Harlow | H04L 12/2697 709/221 |
| 2011/0202755 A1* | 8/2011 | Orsini et al. | 713/151 |
| 2012/0005730 A1 | 1/2012 | Smith et al. | |
| 2012/0198241 A1* | 8/2012 | O'Hare et al. | 713/189 |
| 2012/0250863 A1 | 10/2012 | Bukshpun et al. | |
| 2013/0208894 A1 | 8/2013 | Bovino | |
| 2014/0270165 A1* | 9/2014 | Durand | 380/46 |

OTHER PUBLICATIONS

International Search Report and Written Opinion of the International Searching Authority mailed Nov. 12, 2014, issued in corresponding International Application No. PCT/US2014/050574.

International Preliminary Report on Patentability and Written Opinion of the International Searching Authority mailed Feb. 18, 2016, issued in related International Application No. PCT/US2014/050574.

Notice of Allowance and Fee(s) Due dated Nov. 10, 2016, issued in related U.S. Appl. No. 14/692,841.

Deng, Fu-Guo, et al., "Secure direct communication with a quantum one-time pad," The American Physical Society, Physical Review A, vol. 69, 052319, 2004, 4 pages.

Office Action dated Jun. 9, 2016, issued in related U.S. Appl. No. 14/692,841.

\* cited by examiner

STREAMING ONE TIME PAD CIPHER USING ROTATING PORTS FOR DATA ENCRYPTION

CROSS-REFERENCE TO RELATED APPLICATIONS

Benefit is claimed from U.S. Provisional Patent Application No. 61/864,383 filed Aug. 9, 2013.

STATEMENT REGARDING FEDERALLY SPONSORED RESEARCH OR DEVELOPMENT

None.

FIELD

The technology herein relates to computer security, and more particularly to secure methods for transferring data electronically across a network. Still more particularly, the technology herein relates to data encryption techniques using rotating ports, one time pads and/or block and/or stream ciphers.

BACKGROUND

Data encryption is known that uses streaming ciphers, block ciphers or one time pads. Streaming and block ciphers are widely used even though they are not mathematically provable to be 100% secure. These can use asymmetric (or public key) cryptography. The keys are typically of a fixed size and may be static. A calculation is done one each side to encrypt or decrypt the data. In a typical public key scenario, a sender uses the public key of a public-key and private-key pair to encrypt a message. The receiver uses the corresponding private key to decrypt the message. Security is provided because it is generally computationally infeasible to derive the private key from the public key.

One-time pads ("OTP's") were invented early on in the 20th century and are the only provably secure cryptosystem. In a manual one time pad scenario, the sender has a pad of paper on which is written randomly chosen key letters. The key is the same size as the message. In one implementation, the sender adds one key letter to each plaintext letter to produce cipher text, and never repeat the key letters. For example, assume the message is "YES" and the pad letters are "CMG". You add Y (25) to C (3) to get B (26+3=2 modulo 26), or E (5) to M (13) to get R (18). The sender then destroys the paper. The receiver reverses the process using his pad of paper (the encryption is thus symmetric), and then burns the key letters when he is done.

Because the key is the same size as the plaintext, every possible plaintext is equally likelyand it is impossible for an attacker to tell when the correct decryption has been derived. See e.g., Schneier, *Secrets and Lies: Digital Security In a Networked World* (Wiley Publishing, 2000).

Some streaming ciphers attempt to approximate a pseudo One Time Pad (OTP) operation. In such scenarios, the transmitter and receiver independently but synchronously generate the same key. Because the keys are calculated and not truly random, they can sometimes be cracked (the key is insecure because it is calculated) but may provide adequate security depending on the context and cryptographic algorithms used. Streaming cipher calculations can sometimes take considerably more time than a single add or exclusive OR operation as is used in certain one time pad implementations, but this calculation time can have different impacts depending on context.

Even in systems that are still secure now, history has shown exploits will be found over time. Accordingly further improvements are desirable.

BRIEF DESCRIPTION OF THE DRAWINGS

Example non-limiting embodiments and implementations will be better and more completely understood by referring to the following detailed description in conjunction with the drawings of which.

DETAILED DESCRIPTION

Figure 1:
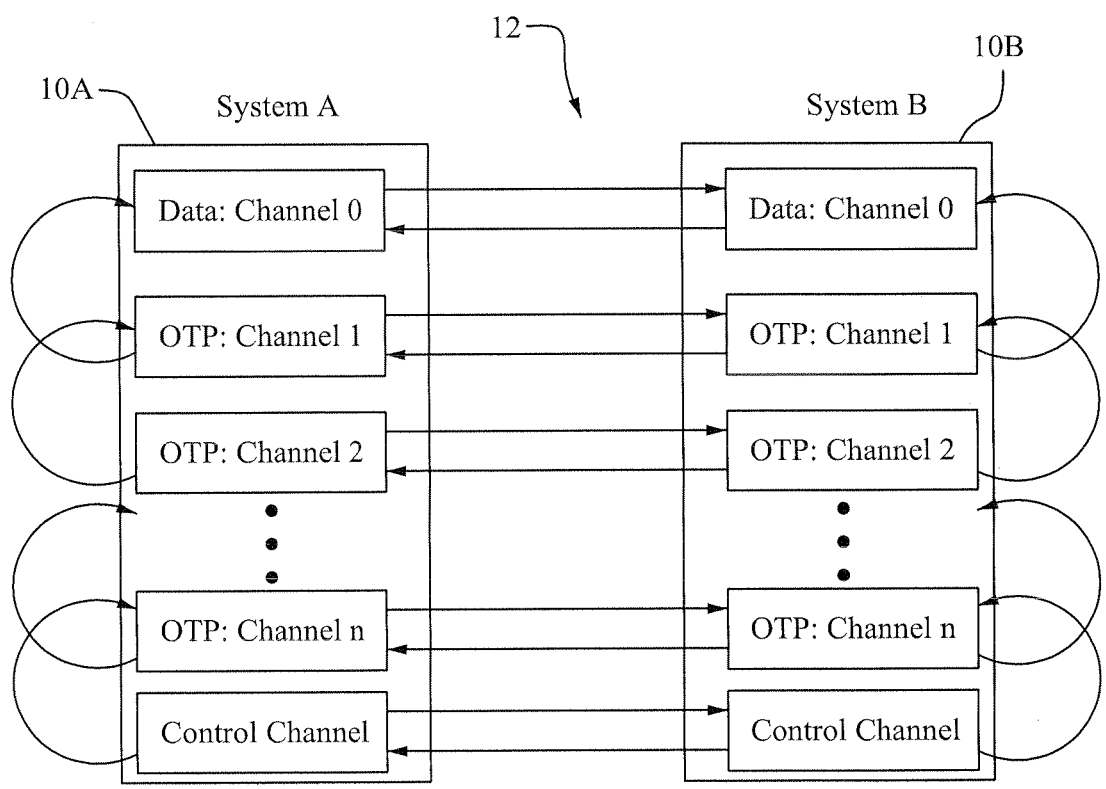
FIG. 1 is a block diagram of example rotating one time pad (OTP) communications system.

In one example non-limiting embodiment, the onetime pad is generated on one side with random data and sent to the other side. If the transmission is secure, there is no method in cryptography to attack this and it is proven impossible to crack. Through forward caching of OTP data, latency increases are kept to an absolute minimum as the XOR for encryption and decryption can be a single CPU cycle instruction on most systems. For example, in some example implementations, the OTP data can be streamed continually from the transmitter to the receiver, or the OTP data could be generated elsewhere and streamed to both the transmitter and the receiver. The OTP data can be transmitted at any data rate including a data rate that is lower than the message transmission data rate. For example, the OTP data could be conveyed securely over an entirely separate communications channel such as human courier, digital control channel, or any other conveying means. Upon generation and transmission, the OTP data can be cached in a memory and used as needed to encrypt/decrypt as needed. The transmitter and receiver continually maintain indices of which parts of the OTP data have already been used and which parts have not yet been used and are thus the next ones to use. In example non-limiting implementations, each item (e.g., character, hexadecimal value, etc.) in the OTP stream is used only once to encrypt a single item (e.g., character, hexadecimal value) using a simple XOR. After being used to encrypt an item in the message, an OTP item is then discarded in the example non-limited implementation and is not used again for encrypting any more message data.

As stated above, non-limiting embodiments provide mathematically provable secure methods for transferring data electronically across a network.

A One Time Pad securely encrypts data transmissions. The OTP may be sent on a separate data communication channel encrypted likewise. In one example implementation, there is one public key channel that uses a known public key (asymmetric) encryption method but does not have a fixed port for communication and hence is hard to intercept. Such an encrypted channel is used to transmit an OTP.

Non-limiting embodiments use N number of channels allowing the OTP to be generated randomly by the sender with no predefined scheme and sent to the receiver securely. There is no calculation to discover hence this is a pure OTP operation. The communication channels also rotate their physical and/or logical ports periodically. This makes intercepting and studying the stream very difficult. It also obfuscates the public key channel from the OTP encrypted channels hiding the potentially vulnerable public key channel. It also opens the possibility of sending the data channel, OTP channel(s) and the public key channel across different networks creating a physical network access barrier.

One example non-limiting embodiment rotates which channel is responsible for sending control messages. These control messages could be cracked using current encryption techniques if they are for example in a known, repeated format. The example non-limiting embodiment moves these control messages around not just in the stream (always in different spots) and may also move the channel which they are transmitted on. Other than initial messages, these can always be transmitted across an OTP encrypted stream (not the public key channel). This could include the data/message channel(s), which is uncrackable without compromising the public key channel. Since the public key channel is sending random OTP data, that's mathematically impossible to figure out/crack for the same reason OTP is impossible to figure out. The public key channel could be sending anything and there is no pattern to the data in such an example non-limiting embodiment.

Because the example non-limiting embodiment uses a single XOR operation, latency in the transmission of data is decreased as long as a forward buffer of OTP data is maintained.

The example non-limiting arrangement can be used in routers, switches, network cards, secure phone, secure video, secure wireless voice, peripheral cards or in any type of machine or system that requires high security communication transmission.

One non-limiting embodiment includes:
1. Data Message(s) To Send
2. Random number generator for creating One Time Pads (OTP)
3. OTP Encryption Function—This will do "Exclusive Or" (XOR) on blocks of data.
4. Encrypted Message
5. Message Communication Channel
6. OTP Communication Channel(s) (Can be 0 . . . * number of channels.)
7. Public Key Channel
8. Virtual port facade Example Relationships Between Components The following is an example non-limiting scenario for sending an encrypted message. First, a message for the data stream is created or obtained (1). Next, a onetime pad is created (2) to encrypt the message with. A second onetime pad is created (2) to encrypt the first one time pad. Any number of one time pad channels (6) and corresponding one time pads (2) to encrypt the new channel can be created to increase complexity obfuscating the system. Next, communication channels are created for OTP (7) and the message channel (5). A public key channel (7) is created using an alternate, well known secure encryption technique such as a Public Key based stream cipher.

Once the message and OTP data is ready, the encryption function (3) is used. This method combines the data for a given channel with the OTP from its assigned OTP channel. After this is done, the message is ready to be transmitted to the receiver. Once the message is received after transmission, the OTP from the assigned channel is again run through the de(en)cryption function (3) to decrypt the message. (This is the way the one time pad operates—the same pad is symmetrically used to encrypt and decrypt the message.) After that, the decrypted information is ready to be used either as the next channel's OTP or as a decrypted message.

As a precursor to any data being sent, one OTP block is sent to the receiving side as a "primer" pad. This primer allows the streaming process to start in an encrypted manner. In this case, a public key channel (7) is used to send the initial prime OTP block. Optionally this block can be delivered manually.

To further obfuscate communications in non-limiting embodiments, the OTP channel(s) (6), message channel (5) and the public key channel (7) should have their port rotate/change periodically. The port change can be logical and/or physical. This will make intercepting data more difficult. Changing physical ports that ride on differing private networks further increases the security of the system.

In all cases in the non-limiting embodiments, OTP information should be cached on both sides and pre-fetched ahead of messages when possible. When data is sent, this allows it to flow with the least possible latency.

Lastly, virtual ports can be employed (8) in some non-limiting embodiments to allow the protocol to run at the network layer. This allows an entire system to be protected without having to embed the solution in software.

How it Works

When requiring encryption of information across a data network, you first start with the message stream to be encrypted. Next, you will need a random character generator for creating a streaming One Time Pad (OTP). While this can be done in software with sufficient measures taken to ensure randomness, it is encouraged to use a proven hardware random value generator. This has two advantages: 1) the randomness is better (truly random or close to truly random); and 2) processing is offloaded, reducing CPU load. Once a random number generation method is selected, a pad method is created to generate OTPs. Each OTP in the example non-limiting implementation matches the size of the message being encrypted. The OTP will then be sliced into buffers in an array. The sizes (lengths) of the chunks resulting from the slicing process match the sizes (lengths) of the messages to be encrypted and decrypted, and different messages can have different sizes (lengths). This allows chunks of data to be processed and operated on. One chunk of random OTP data for each chunk of message will be run through an Exclusive Or (XOR) operation to be encrypted. To decrypt information with an OTP, the encrypted data and the OTP are run through the XOR calculation reversing the first XOR. In other non-limiting embodiments, transformations other than XOR can be used.

To ensure an OTP itself is not sent clear across the network, it is also encrypted in the same manner with another OTP. To further obfuscate the data, multiple OTP channels can be used. Each channel will be assigned the task of encrypting another channel. In this scheme, there can be a symmetrical number of channels including one public key channel that uses an existing well known encryption method.

The public key channel uses more conventional block or streaming cipher methods of encryption such as asymmetrical public key or other cryptography. In some non-limiting embodiments, such a channel is encrypted, secured or otherwise protected by technology other than public key cryptography. For example, one non-limiting implementation uses physical security (e.g. a dedicated communications path not easily accessible or otherwise not subject to interception or eavesdropping by an attacker). In other example non-limiting implementations, a symmetric stream cipher is used to protect this channel. This channel can send control messages as well as one OTP stream, and so can be termed a "control channel." After initiation, control messages can be sent across any OTP channel. The responsibility of control messages can also be rotated, further obfuscating the protocol. The system could also be implemented with only a message/data and a public key channel. This may not under some circumstances be sufficiently complex to increase security past the public key channel's implementation, but may nevertheless provide improvements. For example, latency improvements will still be evident even in a two channel system with pre-fetching of OTP information. The data itself will also be uncrackable unless the public key channel is compromised.

Once the number of OTP channels is decided, each OTP stream will be assigned to a given communication channel. At this stage, the non-limiting example protocol will dictate moving channel ports periodically including the public key channel. This adds one more layer of obfuscation and makes it difficult if not impossible to intercept data. This makes even the aforementioned two channel implementation more secure than a standard one channel block or streaming cipher.

To get the process started, an initial OTP chunk is delivered using a secure method. This can be done with the public key channel, a separate secure transmission protocol (such as SSH) or manually using removable storage. This first step is referred to as priming the system.

Here is a summary of example non-limiting steps to running the system:

1—OTP is generated for at least one channel. (N number of other OTP channels may be used.)

2—The OTP, data and public key channel are paired where one OTP channel along with the OTP transmitted on the public key channel encrypts another with a final channel encrypting the actual data.

3—Data and OTP information is broken into chunks of a predefined size for array storage.

4—The initial chunk that encrypts one OTP channel is sent using a secure mechanism to prime the system. This can be done through the public key channel, another secure network channel, physically primed with removable media or any other method imaginable to get the first chunk on both sides securely.

5—Each piece of data is combined with its assigned OTP data.

6—The output of this calculation (encrypted data) is then transmitted across the network to the receiver.

7—The receiver runs an XOR calculation on its data chunk and the assigned OTP chunk producing the unencrypted message.

8—Communication channel ports (physical, logical or both) are rotated periodically. This removes the opportunity to intercept and inspect data of a given stream.

9—Optionally the public key channel cipher can be changed periodically. This further obfuscates messages as there is no longer one encryption mechanism to decipher by a potential cracker.

Using this protocol at the network layer, this entire scheme can be fronted by a virtual port backed up by network facing ports that are either physical, logical or both. This allows the system to behave with software as expected but lets the protocol do something very different in the network. This method could also be expended out to network equipment.

Example Non-Limiting Way to Make

To make the preferred embodiment system, you can use two computers, at least one computer or other data or other communications network, an existing encryption mechanism for the public key channel and a reliable random number generator. The two computing resources may have connectivity across one or more computer networks. Next, a public key channel is established across the network. Next, the random number generator is used to create one or more one time pads streams. Next, a series of communication channels are established to send both messages and OTP information across the network. The public key channel is responsible for one of the OTP streams to be sent. Each OTP stream and the OTP in the public key channel is assigned to encrypt another channel (including the data/message channel). At this point, each channel encrypts its data by taking its assigned OTP and calculating the product using an Exclusive Or (XOR) operation. That encrypted data is then transmitted to the receiving computer, where the process is reversed. The encrypted data is combined with the assigned OTP data, producing the unencrypted information. Communication channel ports and control channel ciphers can be rotated periodically to obscure the information in the network.

Data to be securely delivered, a network, two computers, random number generator and an existing encryption mechanism for a control channel are all used in one non-limiting arrangement. The OTP communication channels are not necessary as the system could be built with simply a data and control or other encrypted channel. In this arrangement, however, security would not be as robust. Adding one or more OTP channels increases the complexity of the communication, which adds obfuscation. The system can also be constructed without rotating the ports but again this removes misdirection and obfuscation leading to a less secure solution.

A VPN network or secure tunnel could be added to the already encrypted control channel to add another layer of encryption. This may increase the security of the control channel. The more layers of encryption added, the more secure that channel's communications will potentially be.

FIG. 1 shows an example non-limiting system for rotating OTP communications. The example system includes two systems (10A and 10B) coupled together with n communications channels (12). An encrypted control or other channel can be used to exchange the OTP key data, and there can be multiple data communications channels used to communicate different encrypted parts of the message. Because each item in the securely exchanged OTP is used only once to encrypt a single item in the message and is then discarded, the system is provably secure so long as the channel used to exchange the OTP is secure.

OTP data received is sent to and used by another communications channel. This can be arranged in any way and does not necessarily need to go to the next channel. This should also be shuffled in some non-limiting embodiments as long as the OTP indices and data indices align. The OTP data received is sent to and used by another channel. This can be arranged in any way and does not necessarily need to go to the next channel. This could also be shuffled as long as the index's OTP and data indices align. Each channel will encrypt another. Each channel will buffer its OTP data to a set amount during idle time. This will allow the data channel to send its information unencumbered. A control channel that uses an existing well known block or streaming cipher mechanism (similar to ssh Transport Layer Encryption or public key cryptography) can be used to carry one of the OTP streams. Channels may also be rotated. This can happen in many ways depending on how channels are defined and established. For instance, in a pure TCP/IP scheme with a single physical port, channels can represent logical ports. Ports will be changed periodically but only the two sides will know about this. Internally, the system may refer to the channel numbers. In this way, the physical mechanism each channel uses is unknown and can change.

In a more complex scheme, we may have N number of physical channels that traverse differing or different networks. For example, in one implementation, some channels might be transmitted over the Internet, other channels might be transmitted using a wide area, public data or cellular telephone network, and still other channels might be transmitted using a physically secure landline, direct line of sight electromagnetic communication, through physical transportation of a memory storage medium, or by any other means. The channels could actually change networks as well as ports further obfuscating the data being sent. In this way, you could send the data across the public Internet while securely sending the pads on one or more private line networks. As long as pad data is pre-cached sufficiently, latency will not suffer.

Which channel provides an OTP for which side should also be configurable in some non-limiting implementations. Since all OTP channels contain random streams of characters, the OTP channel pairs can also be rotated as long as the OTP and stream indices line up on rotation. Random rotation offsets make it very hard to tell what the new port/channel/socket is for and doesn't allow an attacker to "time up" the port rotations. Cipher algorithms and/or keys in the public key channel can also be rotated making decrypting the cipher at any moment more difficult. Lastly, the control messages can be sent across any channel and rotated periodically. This makes tracking control messages more difficult.

Figure 2:
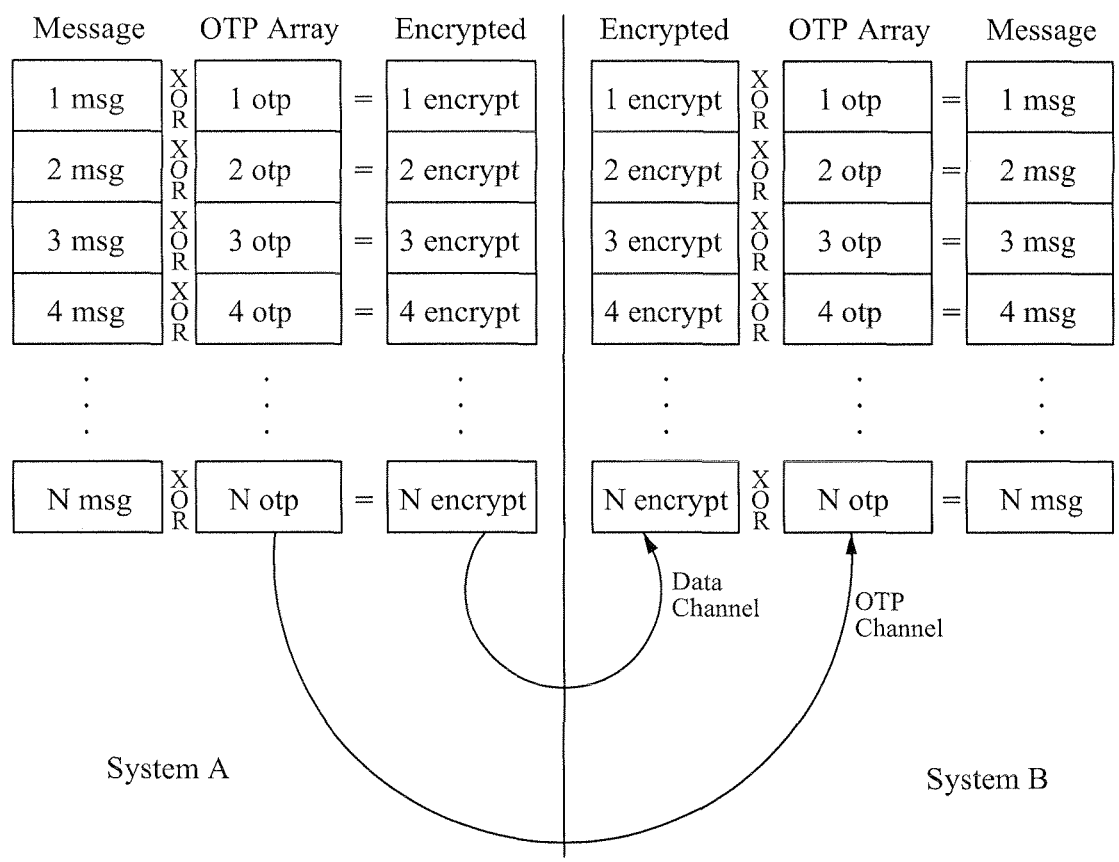
FIG. 2 shows example message encryption.

FIG. 2 shows an example of the data broken into an array and encrypted using a One Time Pad. Data message block 1 is encrypted (e.g., XOR) with a first OTP block to produce cipher text which is transmitted. Upon receipt, the cipher text is decrypted (e.g., XOR) using the same OTP block to recover the original data message block. Similarly, a second OTP block is used to encrypt a second data message block, a third OTP block is used to encrypt a third data message block, and so on.

Figure 3:
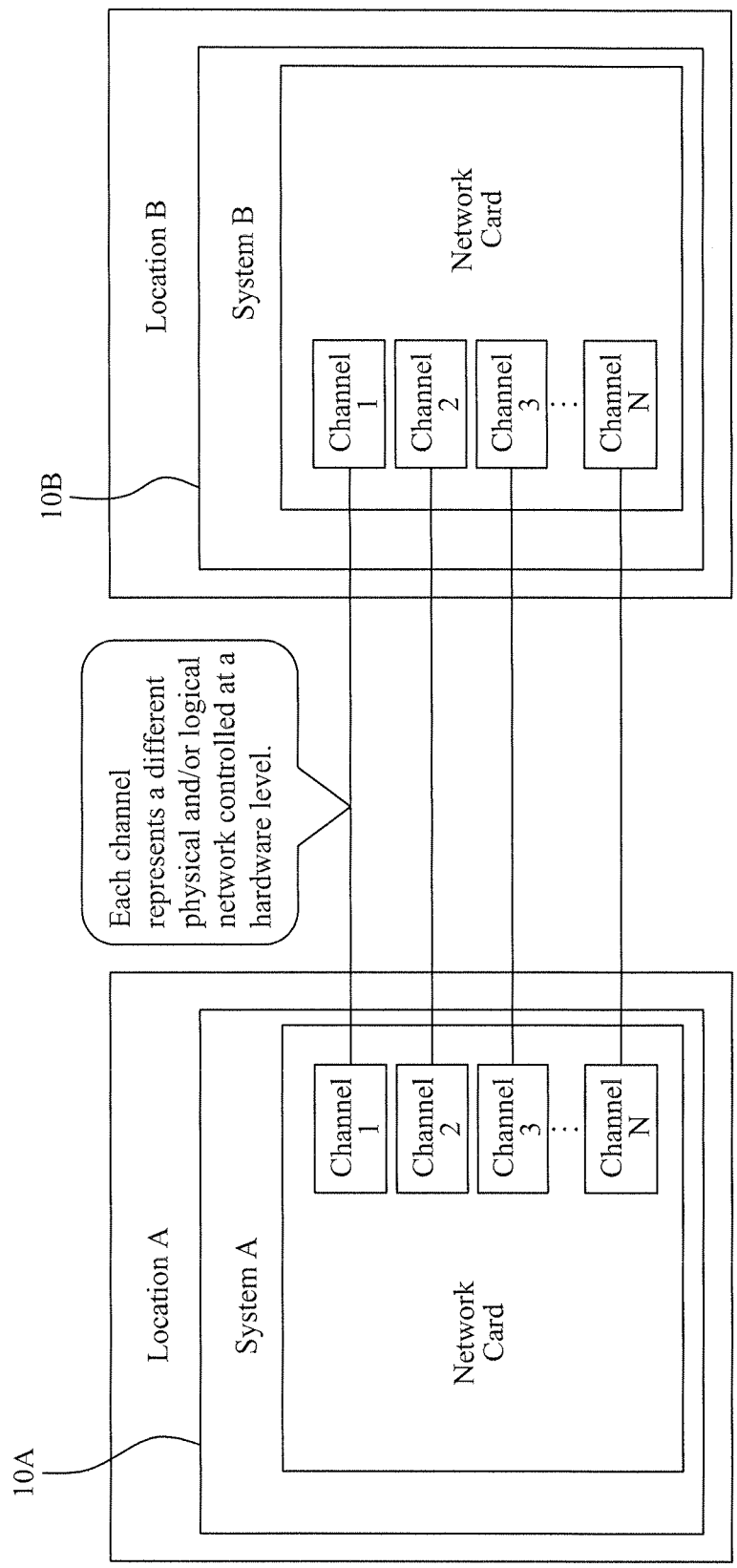
FIG. 3 is a block diagram showing example use of different channels communicating between two systems to provide one time pad messaging.

FIG. 3 shows a hardware implementation and how system 10A at location A can transmit to system 10B at location B, over a variety of different channels. In this case, each channel represents a different physical and/or logical network controlled at a hardware level. Such different channels can be defined using the same or different network cards, and can be wireless, wired or a combination. Some non-limiting embodiments could also employ a second (or n number) of secondary networks. This allows sending of OTP data across completely separate physical networks. This would be an excellent idea for the control channel for instance. In this way, access to multiple physical networks would be required to compromise the system. Using VPN networks would have a similar effect to using separate physical networks.

The virtual interface is not required as the system can be embedded directly in an app or other transportable or downloadable software. Using a virtual interface allows any application using the interfaces virtual ports to be protected without modification.

When multiple networks are used, any channel can go across any network and the system will behave the same. It is also possible to configure the system with only a control and data/message channel and the system will also work in a similar manner. Lastly, any channel sending OTP data can be assigned to any other communication requiring OTP encryption. As long as chunks are aligned, the OTP streams can be interchanged (since they are random numbers) and the system will still behave.

How to Use

There are at least four primary ways to use this application: 1) Embed the solution directly in an application; 2) provide a proxy application that works like a tunnel; 3) create a virtual port layer directly injecting the solution in the network layer; or 4) embed the protocol directly in hardware (network card, switch, router, transport gear, . . . ). Further variations and combinations are also possible including solutions that may cross multiple network media including but not limited to copper, fiber, wireless, radio and satellite. In all cases, the message data is transmitted across the network in an uncrackable or otherwise secure format.

For example usage 1, the user would take libraries created for the solution and implement the functions and classes replacing any socket connections with the class implementation. Such instructions could be stored in non-transitory storage and be executed by a processor. The actual workings of the encryption are abstracted from the user in this case. Configuration will set initial ports, number of OTP channels and possibly configure the encryption used for the command channel.

In example usage 2, the process is configured and a listen port established to allow processes to connect through. Again, the implementation details are extracted out. Configuration is similar to option 1.

In the third example utilization, a virtual port is created to proxy the process(es) to. In this non-limiting configuration, the protocol becomes a module that can be plugged into the network layer of the operating system. This configuration completely abstracts the implementation details away from the end user. In this case, any network application can utilize the functionality by simply binding to the virtual port. Configuration of the system is the same as 1 and 2.

In the fourth example utilization, all functionality is embedded in hardware or in a combination of hardware and software. This can be done directly in a chip such as a custom ASIC, in an e-prom or other storage device, in a gate array or digital signal processor, or any other type of hardware implementation imaginable. In this implementation, the OS is completely abstracted from the inner-workings of the protocol. It is possible to allow configuration as needed. This implementation would likely use multiple physical networks. In this implementation, the solution can be executed at lower network layers.

Additionally: This technology could be embedded in hardware into a chip. In this way, it could be used in routers, switches, network cards, peripheral cards or in any type of machine or system that requires high security communication transmission.

The example non-limiting solution can be used in routers, switches, network cards, secure phone, secure video, secure wireless voice, peripheral cards or in any type of machine or system that requires high security communication transmission.

Figure 4:
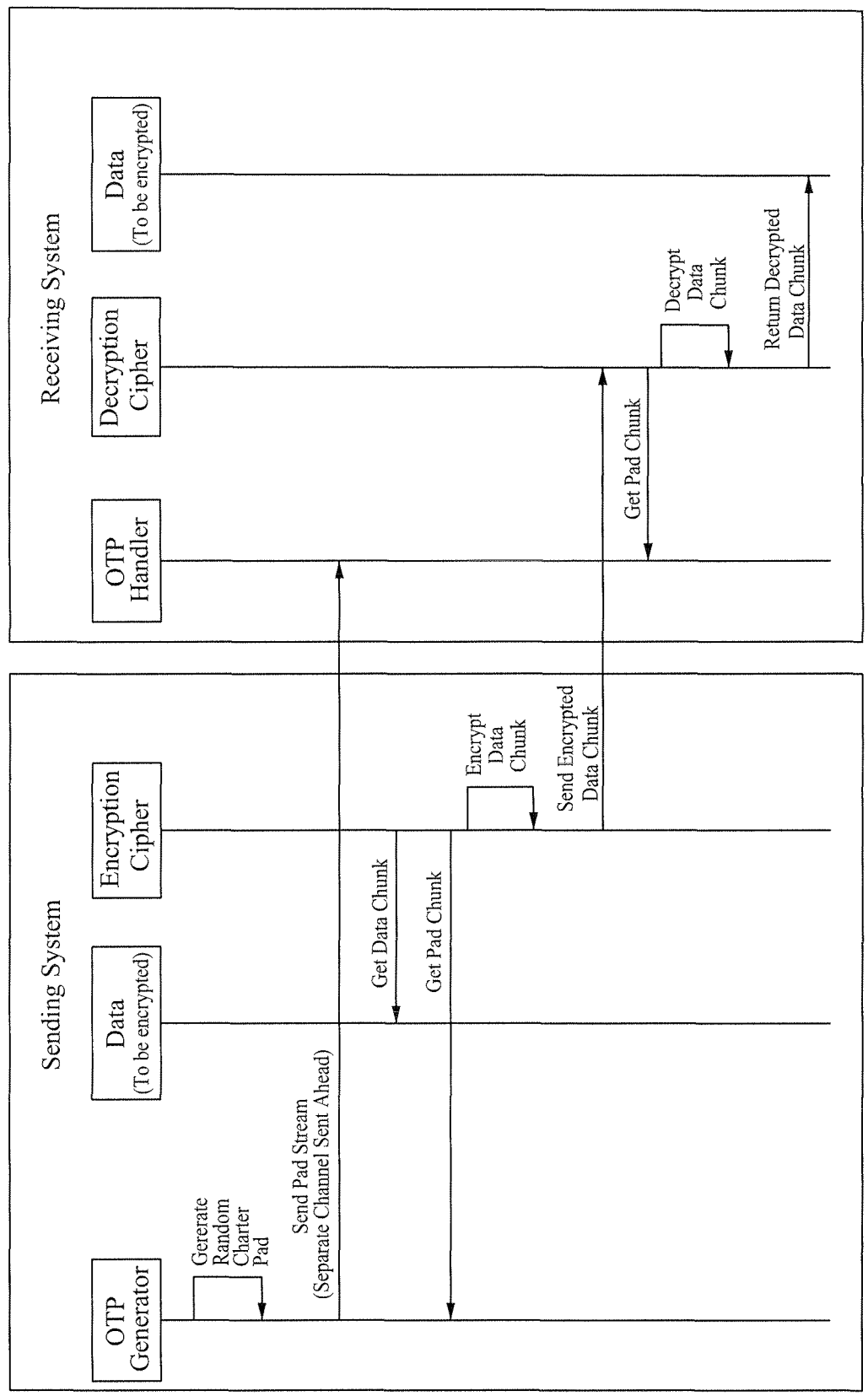
FIG. 4 shows an example non-limiting communications protocol.

In one example implementation shown in FIG. 4, an OTP generator generated a random "charter" pad that is sent via a serial pad stream to the OTP handler on the receive side. Then, encryption block on the sending side gets a data chunk as well as a corresponding pad chunk, encrypts the data chunk with the pad chunk, and sends the encrypted data chunk to the receive side. On the receive side, the data is received by an OTP handler and is then decrypted using the exchanged OTP.

Figure 5:
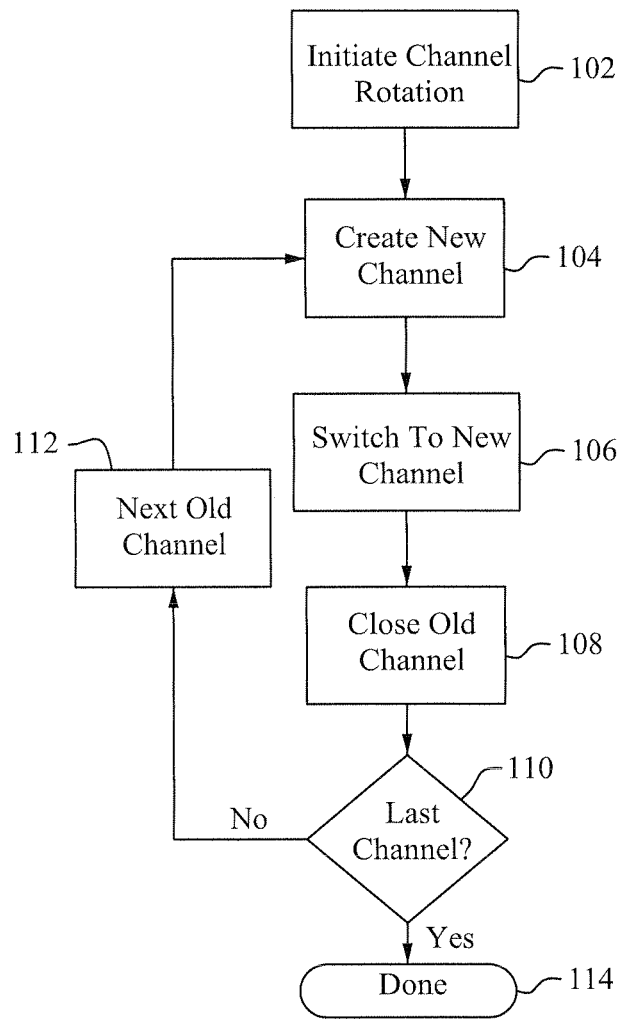
FIG. 5 is an example non-limiting flowchart.

FIG. 5 shows a flowchart of an example non-limiting process. The example system initiates a channel rotation (102) and creates a new channel (104). The system then switches to the new channel (106), closes the old channel (108) and then determines if this is the last channel (110). If not, the system gets the next old channel (112) and creates that as a new channel (104). Otherwise, the process ends (114).

Figure 6:
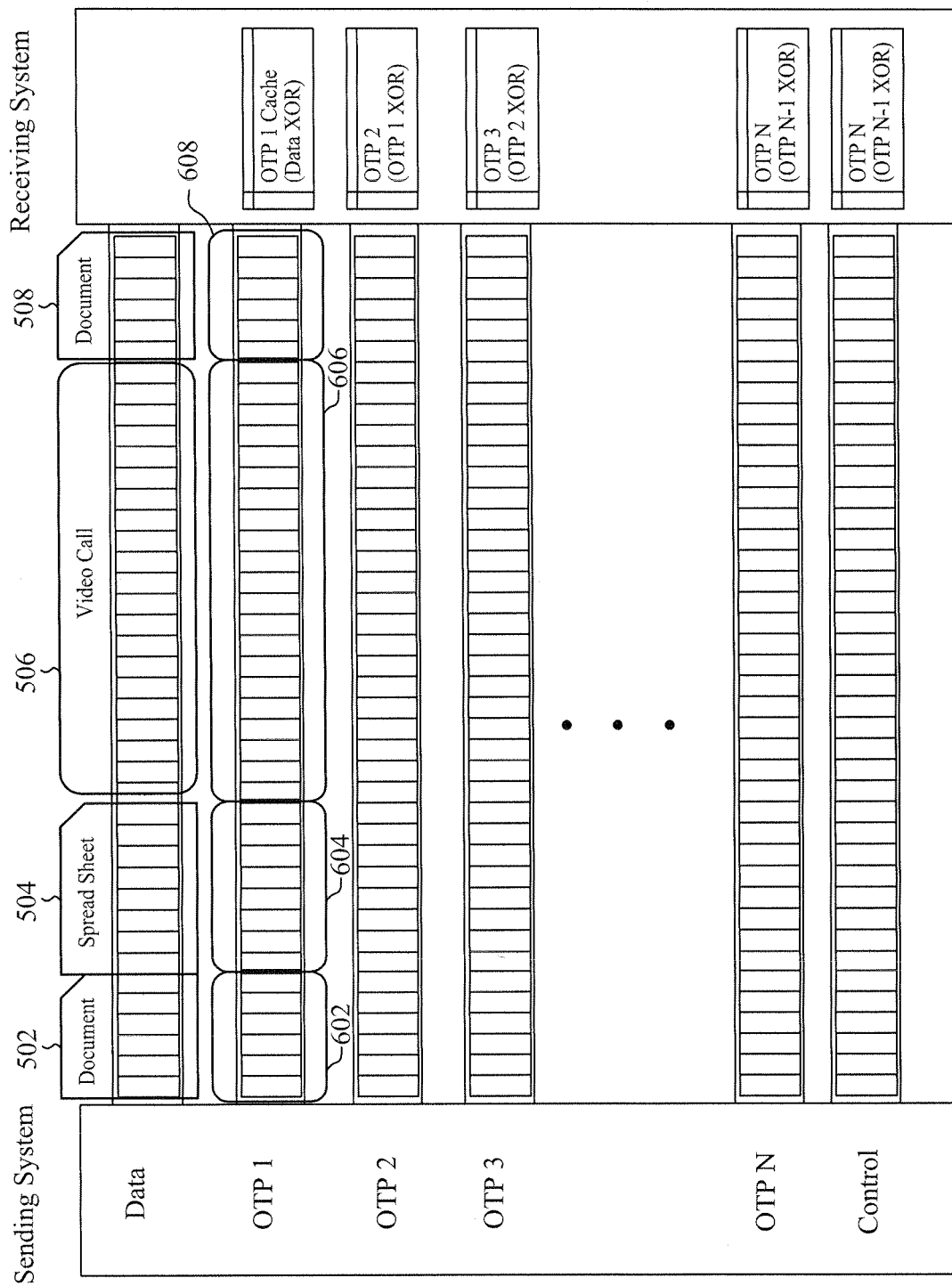
FIG. 6 shows an example of how one time pads can be allocated to and used to encrypt messages.

FIG. 6 shows an example simplified allocation of one time pads to messages. In this example, the sending system wishes to send data to the receiving system, namely a document 502, a spread sheet 504, a video call 506 and a further document 508. A first one time pad OTP1 is used to encrypt the data items 502, 504, 506 and 508, which a first OTP portion 602 being used to encrypt document 502, and second OTP portion 604 being used to encrypt spreadsheet 504, a third OTP portion 606 being used to encrypt video call 506, and a fourth OTP portion 608 being used to encrypt data 508. In the example shown, the encryption is performed by simply XORing binary data elements of OTP 1 with corresponding binary data of data items 502, 504, 506 and 508. Thus, OTP portion 602 is used only to XOR with document 502 of equal length as OTP portion 602; OTP portion 604 is used only to XOR with spreadsheet 504 of equal length as OTP portion 604; and so on.

Meanwhile, in the example shown, OTP1 XORed with the data to obtain OTP2, OTP2 XORed with further data can be used to obtain OTP3, and so on through OTPN. OTPN can be transmitted over the control channel. The order of the encryption shown demonstrates the concepts. Actual order of what encrypts what can vary and can actually be changed for further obfuscation on message block boundaries. Since the data in this particular example is encrypted with ports and channels rotated, it becomes near impossible to intercept and decrypt. Physical security can be used to secure physical access. Adding more channels increases the difficulty (exponentially) of intercepting and recovering the messages. Using different physical networks controlled by different carriers and moving channel ports both physical and logical, it becomes unrealistically complex to crack. An attacker would need N number of spies to gain access to each physical network and to then be able to follow the port/network rotation as well as cipher encryption changes. The example non-limiting technique shown in FIG. 6 thus is effective to hide the control channel. Even with logical virtual networks or simple ports, the complexity makes it impossible to follow. Preferably at least three channels are used (data, top and control) to take advantage of this scheme but more channels can be used if desired.

As discussed above, it is also possible provide one or more decoy channels that appear to an attacker to be a control or OTP channel but which actually transmit meaningless and/or misleading data. Such decoy channels do not need to be encrypted but can rotate ports and may transmit for example random character arrays or other data that mimics encrypted data and/or the one time pad. Such decoy channels can cause an attacker to waste time. Any security system can be cracked given enough time and effort, but if the messages are of the type that lose their meaning or significance with the passage of time (e.g., control information controlling a real time system; tactical instructions to coordinate a human effort; perishable news or intelligence information; etc.), then an attack (e.g., "brute force") that takes longer to be successful than the duration over which the message information remains valuable will likely be rendered worthless.

Figure 7:
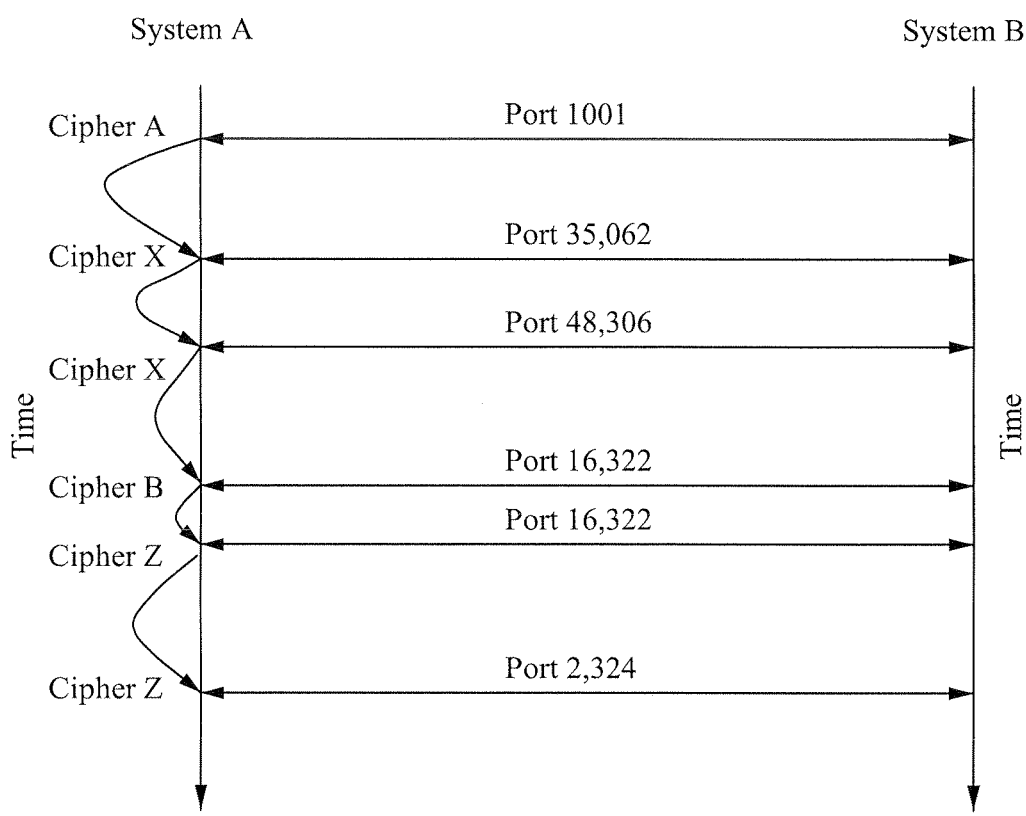
FIG. 7 shows a further non-limiting embodiment.

FIG. 7 shows an additional non-limiting embodiment that uses a block or stream cipher instead of a one time pad and also employs port and cipher rotation. In this diagram, the left-hand axis descending from the top to the bottom of the page is the time axis. Hence, events near the top of the page happen before events near the bottom of the page. In this example non-limiting embodiment, a block cipher algorithm in the public key channel is rotated to make recorded decryption much more difficult. Rotating the port for an existing block cipher can be used to create a simple but effective mechanism for thwarting current interception, inspection and decryption techniques (Carnivore type techniques). The interception in these cases permits the ports (and cipher algorithm(s)) to remain static, and are compatible with any of a number of different conventional cipher algorithms such as known block ciphers including but not limited to Lucifer, IDEA, RC5, AES, Blowfish, etc.

In more detail, FIG. 7 shows an example embodiment that uses a block cipher with only port and cipher rotation. Time is randomized so that different events happen at different random or pseudo-random (and thus unpredictable) times. Not all things are changed at all times (random change). Furthermore, such use of block ciphers may be bi-directional and asynchronous (in contrast, an example non-limiting OTP mechanism may be unidirectional and synchronous).

As shown in FIG. 7, System A may transmit a block cipher A to System B over port 1001. System A may then rotate from cipher A to cipher X, which system A uses to transmits messages. The timing of port and cipher changes are unpredictable by an attacker. System A may continue to transmit additional data using cipher X to system B over port 48,306 at a still later unpredictable time. System A may switch from cipher X to block cipher B which system A uses to transmit data to system B over port 16,322 at a still later unpredictable time. System A later switches from cipher B to cipher Z which system A uses to transmit data to system B continuing use port 16,322. System A may continue to transmit data using cipher Z while switching the port to 2,324.

Alternatively, since the communications channels in FIG. 7 are bidirectional, any of the new cipher derivations shown could be performed by System B rather than System A. For example, System B could initiate the change tocipher X, system A could do the same for cipher B, system B could intiate the change to cipher Z and so on. Additionally, some of the random, pseudo-random or unpredictable timings of the transmissions shown could be determined by system A whereas such timings for other events shown could be determined by system B, or both could independently derive timings that appear to be random or pseudo-random to an attacker but which are actually deterministic based on a shared secret.

While the technology herein has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim as my inventions:

1. A method for communicating information securely comprising:
   (a) transmitting, with a data transmitter over plural rotating channels and randomly rotating ports, to securely stream an encrypted one time pad to a receiver, wherein encrypting, and transmitting over the plural rotating channels and randomly rotating ports conceal the transmitted one time pad from an eavesdropper;
   (b) using at least one processor, encrypting at least one message(s) using the one time pad;
   (c) using the same or different data transmitter, transmitting the encrypted at least one message(s) to the receiver while the data transmitter streams said encrypted one-time pad to the receiver over the plural rotating channels and randomly rotating ports;
   (d) controlling rotation between said plural rotating channels;
   (e) using an encrypted control channel to securely coordinate the data transmitter and receiver to randomly rotate between said randomly rotating ports; and
   (f) using a virtual port to façade communication of the at least one message(s) at a network layer.

2. The method of claim 1 wherein the encrypting comprises XORing the at least one message with the one time pad.

3. The method of claim 1 wherein one time pad streaming is performed over secure public key encrypted channels.

4. The method of claim 1 wherein transmitting the encrypted at least one message comprises sending the at least one message in different parts over different randomly rotating ports.

5. The method of claim 1 wherein sending over rotating channels comprises using random rotation offsets to rotate between different channels.

6. The method of claim 1 further including discarding the one time pad after using it to encrypt one message.

7. The method of claim 1 wherein the processor uses portions n of the one time pad corresponding in size to messages m to encrypt the messages m.

8. The method of claim 1 further including transmitting over at least one decoy channel to the receiver, the decoy channel rotating between ports and providing a decoy data stream that mimics encrypted data and/or the one time pad.

9. The method of claim 1 further including sending the one time pad and the encrypted at least one message(s) over different channels.

10. The method of claim 1 further including using a random number generator to generate the one time pad.

11. The method of claim 10 where the random number generator is located on a system different from the one that transmits the at least one encrypted message(s) to the receiver.

12. The method of claim 1 further including establishing a VPN network or secure tunnel.

13. The method of claim 1 further including caching the One Time Pad data in a memory to be used to encrypt/decrypt.

14. The method of claim 1 further including encrypting the one time pad with at least one further one time pad.

15. The method of claim 1 wherein contents of each of the plural channels are used to encrypt other channels.

16. The method of claim 1 further including using a VPN network or secure tunnel to add another layer of encryption.

17. A method for communicating information securely comprising:
   (a) securely receiving an encrypted one time pad streamed over plural rotating channels and randomly rotating ports;
   (b) at the same time as securely receiving the one time pad stream, also receiving cipher text that was encrypted using the one time pad;
   (c) using at least one processor, decrypting the received one time pad stream and decrypting the at least one message using the received cipher text and the received decrypted one time pad;
   (d) controlling rotation between said plural channels;
   (e) controlling random rotation between said randomly rotating ports;
   (f) using an encrypted control channel to securely coordinate random port rotation; and
   (g) using a virtual port to facade communication of the message at a network layer.

18. The method of claim 17 wherein the decrypting comprises XORing.

19. The method of claim 17 wherein the streamed one time pad is received over secure encrypted public key channels.

20. The method of claim 17 wherein cipher text receiving comprises receiving the cipher text in different parts over different randomly rotated ports.

21. The method of claim 17 further including using a random number generator to generate the one time pad.

22. The method of claim 17 further including discarding the one time pad after using it to decrypt one message.

23. The method of claim 17 wherein the processor uses portions n of the one time pad corresponding in size to messages m to decrypt the messages m.

24. The method of claim 17 further including using a VPN network or secure tunnel to add another layer of encryption.

25. A system for communicating information securely comprising:
   (a) a random number generator generating a one time pad;
   (b) an encryptor that encrypts at least parts of the generated one time pad;
   (c) a stream transmitter that securely streams the encrypted one time pad to a receiver over plural rotating channels and randomly rotating ports;
   (d) an encrypted control channel configured to securely coordinate random port rotation;
   (e) at least one processor that encrypts at least one message using the generated one time pad;
   (f) a data transmitter that transmits the at least one encrypted message to the receiver concurrently with the stream transmitter securely streaming to the receiver the encrypted one time pad;
   (g) a controller that controls rotation between the plural rotating channels and random rotation between ports; and
   (h) a virtual port that facades communication of the at least one encrypted message at a network layer.

26. The system of claim 25 further including a VPN network or secure tunnel configured to add another layer of encryption.

27. A system for communicating information securely comprising:
   (a) a stream receiver that securely receives (i) an encrypted one time pad stream over plural rotating channels and randomly rotating ports, and (ii) additional information from a listen plane including an encrypted control channel configured to securely coordinate random port rotation;

(b) a data receiver that receives at least one message encrypted with at least a portion of the one time pad stream while the stream receiver securely receives the encrypted one time pad stream;

(c) at least one processor that decrypts the received encrypted one time pad stream and decrypts the at least one received encrypted message using the received decrypted one time pad stream, (d) a controller that controls rotation between said plural rotating channels and between said randomly rotating ports; and (e) a virtual port that facades, at a network layer, communication of the encrypted message.

28. The system of claim 27 further including a cache that stores portions of the one time pad stream until needed to decrypt the at least one message.

29. The system of claim 27 wherein the receiver receives at a time and using a randomly rotated port sequence that is not predictable by an attacker.

30. The system of claim 27 wherein the receiver receives using rotating ports the rotation of which is unpredictable to an attacker.

31. The system of claim 27 further including a VPN network or secure tunnel configured to add another layer of encryption.

* * * * *